US009693112B2

(12) United States Patent
Liu et al.

(10) Patent No.: US 9,693,112 B2
(45) Date of Patent: Jun. 27, 2017

(54) REMOTE CONTROL SYSTEM FOR A SMART TELEVISION

(71) Applicant: Xiaomi Inc., Beijing (CN)

(72) Inventors: Huadong Liu, Beijing (CN); Jun Zhang, Beijing (CN); Yi Ru, Beijing (CN)

(73) Assignee: Xiaomi Inc., Beijing (CN)

( * ) Notice: Subject to any disclaimer, the term of this patent is extended or adjusted under 35 U.S.C. 154(b) by 34 days.

(21) Appl. No.: 14/712,622

(22) Filed: May 14, 2015

(65) Prior Publication Data

US 2015/0271543 A1   Sep. 24, 2015

Related U.S. Application Data

(63) Continuation of application No. PCT/CN2014/091194, filed on Nov. 14, 2014.

(30) Foreign Application Priority Data

Mar. 20, 2014  (CN) .......................... 2014 1 0105560

(51) Int. Cl.
| H04N 21/414  | (2011.01) |
| H04N 21/643  | (2011.01) |
| H04N 21/6332 | (2011.01) |
| H04N 21/41   | (2011.01) |
| H04N 21/436  | (2011.01) |
| H04N 21/422  | (2011.01) |

(52) U.S. Cl.
CPC ... *H04N 21/64322* (2013.01); *H04N 21/4126* (2013.01); *H04N 21/41407* (2013.01); *H04N 21/42224* (2013.01); *H04N 21/43615* (2013.01); *H04N 21/6332* (2013.01)

(58) Field of Classification Search
CPC ......... H04N 21/64322; H04N 21/4126; H04N 21/41407; H04N 21/42224; H04N 21/43615; H04N 21/6332
See application file for complete search history.

(56) References Cited

U.S. PATENT DOCUMENTS

| 2007/0053514 A1* | 3/2007 | Imai ................ H04N 21/41407 380/204 |
| 2007/0136778 A1* | 6/2007 | Birger ............... H04N 21/4126 725/117 |
| 2009/0298535 A1* | 12/2009 | Klein ............... H04N 21/43615 725/38 |
| 2010/0031286 A1* | 2/2010 | Gupta ............... H04N 21/4622 725/38 |

(Continued)

*Primary Examiner* — Pankaj Kumar
*Assistant Examiner* — Alexander Boyd
(74) *Attorney, Agent, or Firm* — Quarles & Brady LLP

(57) ABSTRACT

A remote control system for a video playback device, such as a smart television is provided herein. The system can obtain a playback task customized by a user via a server or a remote control device. The playback task can include at least a content file source. The server or remote control device can obtain playback instructions corresponding to the playback task and communicate the playback instructions to the playback device. The playback device can obtain a content file from the content file source via a residential gateway associated with the playback task after receiving the playback instructions, and then play the content file.

15 Claims, 12 Drawing Sheets

(56) References Cited

U.S. PATENT DOCUMENTS

| | | | |
|---|---|---|---|
| 2010/0095332 A1* | 4/2010 | Gran | H04N 21/4126 725/93 |
| 2011/0273625 A1* | 11/2011 | McMahon | H04N 21/4126 348/734 |
| 2011/0298596 A1* | 12/2011 | Warrick | H04N 21/4126 340/12.53 |
| 2012/0020651 A1* | 1/2012 | Gilson | H04N 21/4334 386/296 |
| 2014/0181855 A1* | 6/2014 | Fife | H04N 21/25841 725/25 |

* cited by examiner

REMOTE CONTROL SYSTEM FOR A SMART TELEVISION

CROSS REFERENCE TO RELATED APPLICATION

This application is a continuation-in-part of International Application No. PCT/CN2014/091194, filed Nov. 14, 2014, which is based upon and claims priority to Chinese Patent Application No. 201410105560.3, filed Mar. 20, 2014, the entire contents of which are incorporated herein by reference.

TECHNICAL FIELD

Examples of the present disclosure generally relate to a remote control technology, and more particularly, to a remote control method for a smart television and a related apparatus.

BACKGROUND

With developments in Internet technologies, smart televisions have become very popular. Compared with a conventional television, the smart television has many additional features including features that take advantage of Internet technologies.

Using some Internet technologies with some smart televisions, users can search and select a program to be played. Such a program can be served from a server over the Internet and the playback of such a program can be controlled by the server and/or the smart television. For people that are tech savvy, reaping the rewards of such technologies is second nature. However, for those people that at are less tech savvy it has been difficult for them to adapt to smart televisions and the many benefits that they bring to a user. To some very un-savvy users, even use of basic Internet features, such as searching, selecting, and playback streaming content can he difficult to learn. Therefore, there is clearly a set of problems that can be resolved with technical solutions.

SUMMARY

In order to overcome problems associated with relatively complex interactions with video playback devices (such as smart televisions) for un-savvy users, a set of technical solutions is provided herein. These solutions include technologies and techniques using remote control technologies for video playback devices, especially smart devices.

Examples of such solutions can provide a method making use of a remote control device that can be associated with a playback device. Such a method can include obtaining a video content playback task. The task can be customized by a user through the remote control. The task can include a content file source. The method can also include determining a playback device to perform the task. The method can also include obtaining playback instructions corresponding to the task and communicating the instructions to the playback device. The playback instructions can be generated by the remote control and/or a device external to the remote control, and the instructions can be configured to control the playback device to retrieve at least part of a file of video content linked to the task and being communicated from the content file source.

In an example, the obtaining of the playback instructions can include receiving a triggering event through a user interface, such as through an interaction with the remote control, for activating the playback task. The obtaining of the playback instructions can also include generating the playback instructions according to the triggering event.

In an example, the playback task can include the content file source and a playback time. The playback time can be a certain time or a range of time that content of the playback task is permitted and/or scheduled for starting playback. In such an example, the obtaining of the playback instructions can include managing timing associated with the playback task according to the playback time. The obtaining of the playback instructions can also include generating the playback instructions according to an expiration of the playback time.

In an example, the playback device communicates with a server via a residential gateway. In such an example, the determining of the playback device to perform the task can be performed by the remote control and/or an external device communicatively coupled to the remote control, and the determining can include obtaining an account to associate with the playback task. The account can be associated with the residential gateway. The association of the account with the gateway can be predetermined. Also, the remote control, for example, can query for a gateway that is associated with the account. Also, the remote control can query for a playback device communicatively coupled with the residential gateway in determining the playback device to associate with the playback task.

In an example, the remote control can receive the playback instructions from a server, such as over the Internet. In such an example, the server can generate the playback instructions according to the obtained playback task. In such an example, the playback instructions can include a content file source of a content file, such as a content file containing video content associated with the playback.

In an example, the method can also include receiving boot instructions from a residential gateway. The residential gateway can generate the boot instructions. This can occur when receiving, either at the remote control or at the playback device, the playback instructions from a server. In an example, the generation of the boot instructions can occur after a determination that the playback device is in a standby mode. In such an example, the television or the remote control can switch the playback device from the standby mode to a power-on mode according to the boot instructions.

In an example, the method can also determine whether the playback time has passed. In such an example, the method can also include obtaining the content file (such as video file) from the content file source according to the playback instructions when the playback time has passed.

In an example, any combination of the features described herein may occur in the method. For example, an example method may include: receiving a playback instructions from a server; determining whether the playback device is in a power-on mode or a standby mode; sending a boot instructions to the playback device if the playback device is in the standby mode, in which the boot instructions can be configured to control the playback device to switch to the power-on mode from the standby mode; and communicating the playback instructions to the playback device, in which the playback instructions includes a playback time and a content file source. All of these operations can be performed by the remote control and/or a communicatively coupled external device (such as a server communicatively coupled with the remote control).

In an example, a remote control can be communicatively coupled with a playback device. The remote control can include first obtaining circuitry. The first obtaining circuitry can obtain a playback task customized by a user. The playback task can include a content file source. The remote control can also include determining circuitry. The determining circuitry can determine whether the playback device can operate the playback task. The remote control can also include second obtaining circuitry. The second obtaining circuitry can obtain playback instructions corresponding to the playback task. The remote control can also include communications circuitry that can communicate the playback instructions to the playback device. The playback instructions can be executed, such as by a processor, to control the playback device to obtain a content file from the content file source and then play the content file.

This example remote control can also include a first receiver, which can be associated with or a part of the communications circuitry. The first receiver can receive a triggering event from a user interface that can activate the playback task. Also, the remote control can include first instructions generating circuitry that can generate the playback instructions corresponding to the playback task, according to the triggering event. The playback task can include a playback time. The playback time can also include a scheduled time and/or a certain duration of time or time range. The playback task can also have a play back source.

The remote control can also include a timing circuitry that can perform scheduling and time management for the playback task according to the playback time of the playback task. In such an example, the remote control can also include second instructions generating circuitry that can generate the playback instructions corresponding to the playback task according to the playback task and the expiration of the playback time of the playback task. Alternatively, a server communicatively coupled to the remote control can include such circuitry that can generate the playback instructions, and in such examples, the remote control receives the instructions from the server. Also, at least some of the operations of the remote control described herein can be performed by a server communicatively coupled to the remote control. Such arrangements can reduce processing and memory use in the remote control.

The playback device communicatively coupled to the remote control can also be communicatively coupled to a server via a residential gateway. In such arrangements, the determining circuitry can include first obtaining circuitry that can obtain an account that has access to playback task. The account can be associated with the residential gateway. The remote control can also include querying circuitry configured to query and identify the association between the account and the residential gateway to determine whether the account is permitted to use the residential gateway. The remote control can also include circuitry to determine a playback device communicatively coupled with the residential gateway and permitted to access and operate the playback task.

In example, the remote control can also include a second receiver. The second receiver can receive boot instructions from the residential gateway. The residential gateway can include circuitry that can generate the boot instructions. This generation of boot instructions can occur upon receiving the playback instructions from a server communicatively coupled to the remote control. In an example, the boot instructions may only be received when circuitry of the remote control or the gateway determines that the playback device is in a standby mode. The remote control, the server, and/or the gateway can also include mode switching circuitry that can switch the playback device from the standby mode to a power-on mode according to the boot instructions.

In an example, a remote control, communicatively coupled to a playback device, can include a receiver that can receive playback instructions from a server. The remote control can also include determining circuitry that can determine whether the playback device is in a power-on mode or a standby mode. The remote control can also include first communications circuitry that can communicate boot instructions to the playback device if the playback device is in the standby mode. In such instances, the boot instructions can control the playback device to switch to the power-on mode from the standby mode. The remote control can also include second communications instructions that can communicate playback instructions to the playback device. In such a case, the playback instructions include a content file source and a playback time.

Such a remote control and other remote controls described herein can also include a processor and memory. The memory can be configured to store executable instructions that are executable by the processor to perform any of the operations described herein performed by the remote control. Servers and gateway devices of the gateways can also include such instructions.

The technical solutions provided by examples have following advantageous effects. The playback task customized by the user can obtained via a server. Such a server can obtain the playback instructions corresponding to the playback task and can communicate playback instructions to the playback device corresponding to the playback task. The playback device can also obtain the content file corresponding to the content file source after receiving the playback instructions and plays the content file. Thus, the user can control the playback device to play a predetermined program at a predetermined time from the remote control.

Examples can also include receiving, at a processor of a remote control, a playback task customized by a user, the playback task including a content file source and playback instructions, and the content file source including a content server. These examples can also include identifying, by the processor, an account associated with the playback task; identifying, by the processor, a residential gateway device associated with the account; determining, by the processor, a playback device corresponding to the playback task, the playback device communicatively coupled to the content server via the residential gateway device; determining, by the processor, that the playback device is communicatively coupled with the residential gateway device; and communicating, by a communications interface communicatively coupled to the processor, the playback instructions to the playback device, the playback instructions configured to: control the playback device to obtain the content file from the content server via the residential gateway device, and control the playback device to play the content file.

Examples can also include a playback device, including circuitry configured to receive boot instructions from a residential gateway device, the boot instructions generated by the residential gateway when the residential gateway receives playback instructions from a control server and determines that the playback device is in a standby mode. Such as a playback device can also include circuitry configured to switch the playback device from the standby mode to a power-on mode according to the boot instructions; circuitry configured to receive the playback instructions from the residential gateway device or the control server directly; and playback circuitry configured to execute the playback instructions, the playback instructions executable to: control the playback device to obtain a content file from a content file source, and control the playback device to play the content file.

Examples can also include a remote control device, including a user interface and circuitry configured to receive a trigger signal indicative of a triggering event from the user interface, the trigger signal at least configured to activate a playback task customized by a user. Such a remote control can also include circuitry configured to generate playback instructions of the playback task according to the trigger signal, the playback task also including a content file source; circuitry configured to determine a playback device and a residential gateway device corresponding to the playback task, the playback device and the remote control device communicatively coupled wirelessly, and the playback device and the residential gateway device communicatively coupled wirelessly, via a wired line, or both; and a communications interface configured to communicate the playback instructions to the playback device, wherein the playback instructions are configured to: control the playback device to obtain a content file from the content file source via the residential gateway device, and control the playback device to play the content file.

The above general descriptions and following detailed descriptions are merely exemplary and do not limit the present disclosure.

BRIEF DESCRIPTION OF THE DRAWINGS

Non-limiting and non-exhaustive examples are described with reference to the following figures. The components in the drawings are not necessarily to scale, and like referenced numerals designate corresponding parts throughout the different views.

DETAILED DESCRIPTION

Subject matter described herein is intended to be construed as not being limited to examples set forth herein; examples are provided merely to be illustrative. The following detailed description is not intended to be limiting on the scope of what is claimed.

In an example, a remote control can be communicatively coupled to a video playback device, such as a smart television. With this coupling, the remote control can perform many operations associated with playing video content on a playback device. For example, a playback task customized by a user can obtained by the remote control, via a server, and the playback task can include a content file source. The server can obtain and/or generate playback instructions corresponding to the playback task and communicate the playback instructions to the playback device. The playback device can obtain a content file (such as a video file) corresponding to the content file source after receiving the playback instructions, and can play the content file. The content file can be obtained from the remote control, the server, or even a device of an associated residential gateway. A user of the remote control can then control the playback device to play a predetermined program at a predetermined time remotely according to these instructions and the content file.

Figure 1:
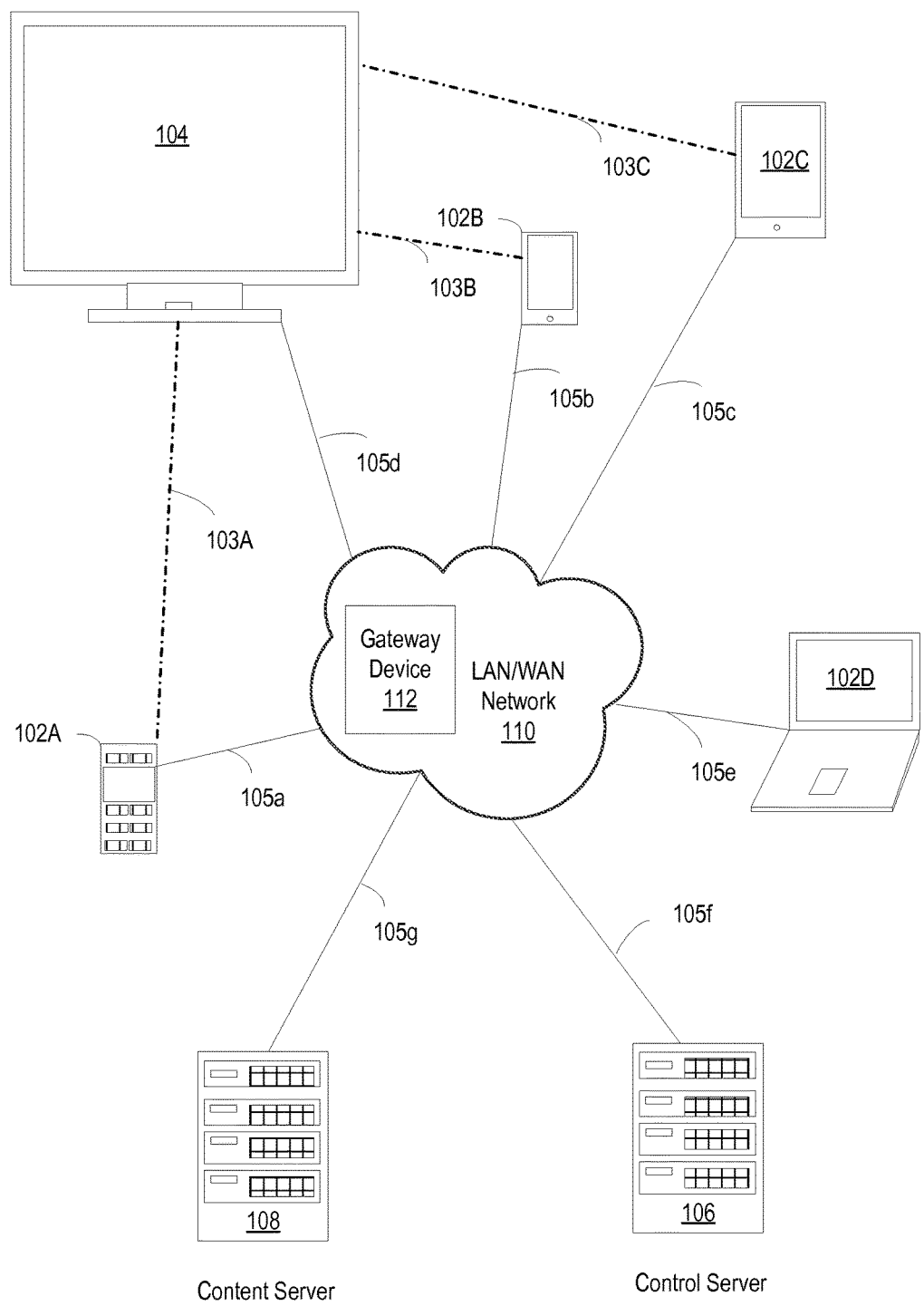
FIG. 1 illustrates a block diagram of example devices of a network of a remote control system for control of video content playback on a smart device.

FIG. 1 illustrates a block diagram of example devices of a network of a remote control system for control of video content playback on a smart device. The network in the example of FIG. 1 includes a control server 106 and a content server 108. The aforementioned servers are communicatively coupled over a network 110 that includes a residential gateway. The gateway includes a gateway device 112. The network 110 may be a computer network. The aforementioned servers may each be one or more server computers. Features described herein may be accessible over the network 110 by client-side devices, such as the smart television 104, the smart television remote control 102A, the smart phone 102B, the tablet computer 102C, and the laptop computer 102D. Each one of these client-side devices may function as a playback device or remote control device. Even the smart television may function has a remote control device in some scenarios.

The servers described herein, may be implemented as a single server, a plurality of servers, or another type of computing device known in the art that provides similar functionality. Access to such servers can be accomplished through a firewall. The firewall protects applications and data, such as account management programs and the account information, from external tampering. Besides a firewall, additional security may be provided via enhancements to the standard communications protocols, such as Secure HTTP (HTTPS) or the Secure Sockets Layer (SSL).

The content server 108 may provide content, such as video content, to any of the devices described herein. Eventually that content can be provided to user, such as played back to the user, by a playback device. A content provider may access the content server 108 over the network 110 to access, add, and update content. This access may be for developing content items, editing content items, and deleting content items. The content server 108 may provide a content provider frontend to simplify the process of accessing the content data of a content provider. The content provider frontend may be a program, application or software routine that forms a user interface. In a particular example, the content provider frontend is accessible as a website with electronic properties that an accessing content provider may view on the content provider device. The content provider may view and edit content data using the content provider frontend. After editing the content data, such as at the content server 108 or another source of content, the content data may then be saved to a content database for subsequent communication to other devices in the network 110. In an example, each content item can be implemented through a content file (such as a video file).

The content server 108 can include logic and data operative to format content for communication to a playback device. The content server 108 can provide content items or links to such items to the control server 106, the gateway device 112, or any one of the terminal devices 104 and 102A-102D.

The aforementioned servers may be implemented through a computing device. A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally, a server may include a central processing unit and memory. A server may also include a mass storage device, a power supply, wired and wireless network interfaces, input/output interfaces, and/or an operating system, such as Windows Server, Mac OS X, UNIX, Linux, FreeBSD, or the like.

The aforementioned servers and databases may be implemented as online server systems or may be in communication with online server systems. An online server system may include a device that includes a configuration to provide data via a network to another device including in response to received requests for page views or other forms of content delivery. Examples of content may include text, images, audio, video, or the like, which may be processed in the form of physical signals, such as electrical signals, for example, or may be stored in memory, as physical states, for example. Examples of devices that may operate as an online server system include desktop computers, multiprocessor systems, microprocessor-type or programmable consumer electronics, etc. The online server system may or may not be under common ownership or control with the servers described herein.

The network 110 may include a data communication network or a combination of networks. A network may couple devices so that communications may be exchanged, such as between a server and a client-side device or other types of devices, including between wireless devices coupled via a wireless network, for example. A network may also include mass storage, such as a network attached storage (NAS), a storage area network (SAN), or other forms of computer or machine readable media, for example. A network may include the Internet, local area networks (LANs), wide area networks (WANs), wire-line type connections, wireless type connections, or any combination thereof. Likewise, sub-networks, such as may employ differing architectures or may be compliant or compatible with differing protocols, may interoperate within a larger network, such as the network 110. Various types of devices may be made available to provide an interoperable capability for differing architectures or protocols. For example, a router may provide a link between otherwise separate and independent LANs. A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links, including satellite links, or other communication links or channels, such as may be known to those skilled in the art. Furthermore, a computing device or other related electronic devices may be remotely coupled to a network, such as via a telephone line or link, for example. Also, such links or channels may be a direct and/or short range wireless signal such as an infrared signal or a Bluetooth signal, for example. Dashed-dotted lines 103A-103C illustrate such short range signals. Longer range links or channels are illustrated by the straight lines 105a-105g.

A client-side device or terminal device, such as any of the devices 104 and 102A-102D, may include a computing device capable of sending or receiving signals, such as via a wired or a wireless network. A client-side device may, for example, include a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, or a wearable computer, for example. Also, the disclosed methods and systems may be implemented at least partially in a cloud-computing environment, at least partially in a server, at least partially in a client-side device, or in a combination thereof.

Figure 2:
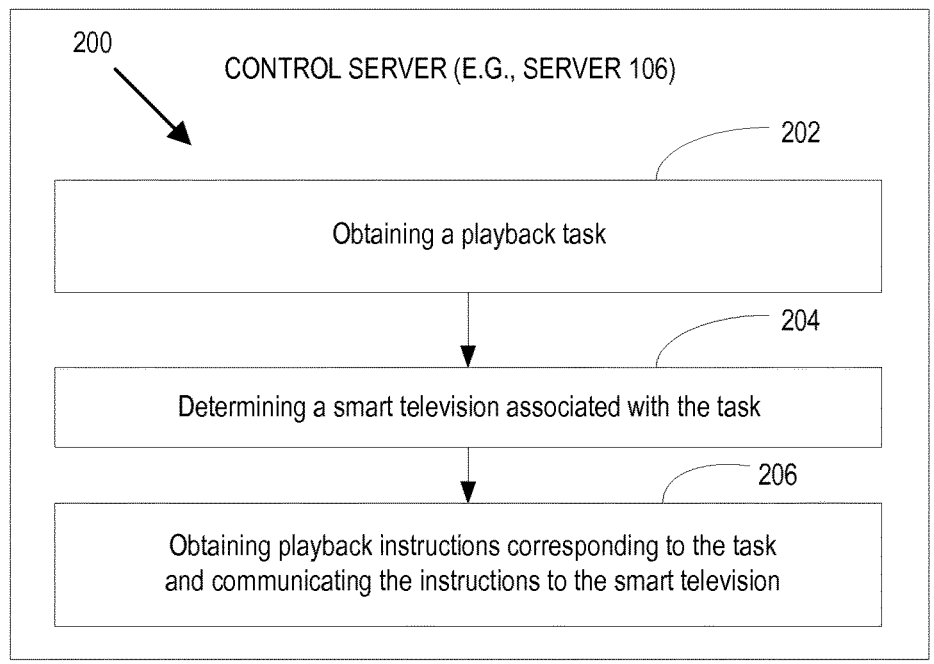
FIGS. 2-4 illustrate flowcharts of example operations associated with a remote control system for a playback device, such as a smart television.
Figure 3:
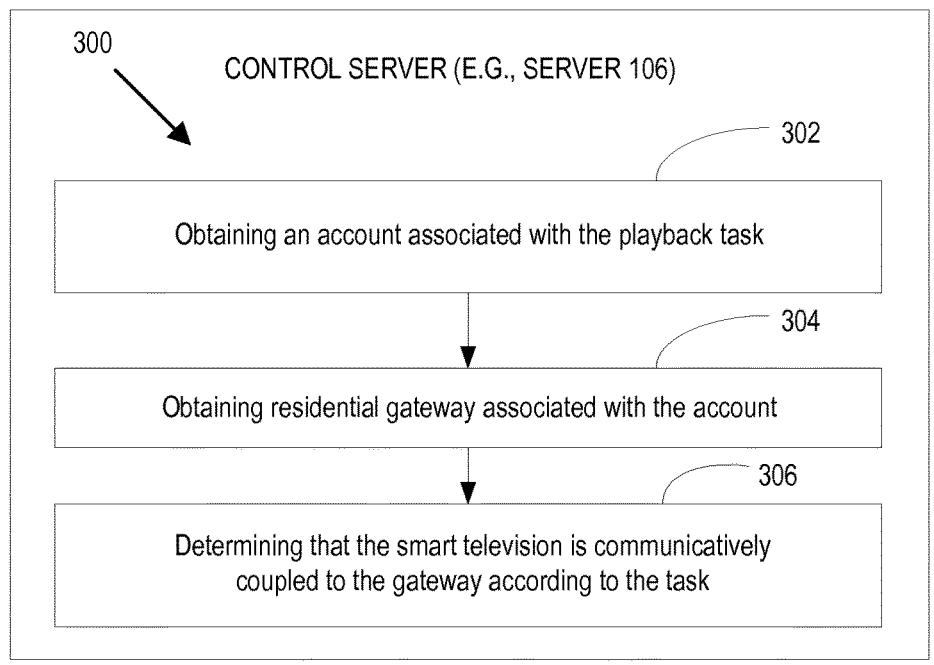
Figure 4:
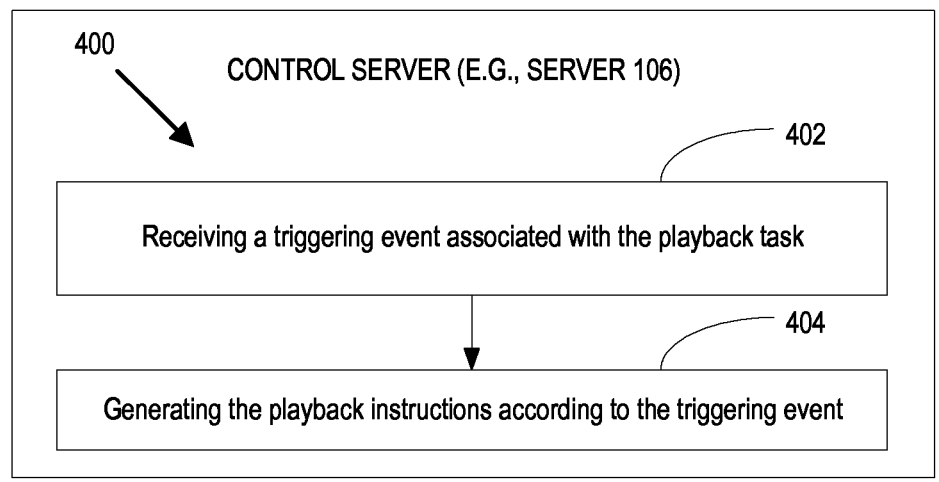

FIGS. 2-4 illustrate example operations associated with a remote control communicatively coupled with a video playback device, such as a smart television. In FIG. 2, a control server (such as the control server 106 illustrated in FIG. 1) implements the operations 100.

At 202, the control server obtains a playback task. The playback task may be customized by a user. Also, the playback task may include at least a link to a content file source. In obtaining the playback task, the control server receives the task at a communications interface. Alternatively, the server generates the playback task.

The playback task may include browsing a program. Browsing a program may include browsing a program being played on a television channel, so that the browsing occurs synchronously with the broadcast of the program. The browsing may also include browsing a program stored on a content server (such as the content server 108 illustrated in FIG. 1). Each type of program, whether stored on a server and broadcasted over a computer network (such as the Internet) or broadcasted over a television network, can be played via a playback device (such as smart television 104 illustrated in FIG. 1) or any other type of device configured to receive and display the content of such broadcasts. Other devices may include a smartphone (such as the smartphone 102*b*), a tablet computer (such as the tablet computer 102*c*), a laptop computer (such as the laptop computer 102*d*), for example. A program on the playback device or any other of these devices may be played through a client-side application, such as a web browser. Selection of a program and customization of the playback task may occur through a GUI of one of these devices or through a remote control (such as the remote control 102*b* illustrated in FIG. 1). The remote control may also have a similar GUI, but such a GUI is reduced in size to adapt to the smaller size of a television remote control. The playback task can include and be retrievable by memory address, an electronic link (such as a hyperlink), or any combination thereof. A link of a playback task can include a part indicating the program.

The server can store, in memory, the playback tasks for multiple accounts. Thus, the server may require a user to login to an account before retrieving respective playback tasks associated with an account. The playback tasks may also be stored and organized in a database. Also, tasks may be reused amongst accounts, so such a database can provide relationships between tasks and accounts.

A playback task may be stored in tables (See Table 1), such as hash tables, for quick retrieval. Such tables can include information pertaining to accounts, content file sources, playback scheduling, playback duration, and modes of operation (such a manual mode, automated mode, default mode, or customized playback mode). The playback duration may be a certain duration of time (such as one hour) or an out of content parts (such as one episode or one chapter).

TABLE 1

| Account of the user | Content file source | Playback time (optional) | Playback duration (optional) | Automatic mode/manual mode (optional) |
|---|---|---|---|---|
| Asdf123 | Source1 | 2:00 pm | 2 hour | Automatic mode |
| Axhfkll | Source2 | 10:00 am | 2 episodes | Automatic mode |
| Cnjfghjl | Source3 | 1:00 pm to 3:00 pm | 1 chapter | Manual mode |

At 204, the playback device associated with the playback task is determined. At 206, the server obtains playback instructions corresponding to the task and communicates the instructions to the playback device. For example, playback instructions corresponding to the playback task can be obtained and the playback instructions is sent to the playback device, in which the playback instructions are configured to control the playback device to obtain a content file (such as a video file) corresponding to the content file source. These instructions can also control the playback of the content file by the television. In examples, a communicative coupling between the playback device, the control server, and the content server, may be through a LAN and/or WAN. Such connections may be facilitated by a residential gateway. In examples, the residential gateway may be implemented by a set top box or an intelligent router.

An activation mode of the playback task may be the automatic mode or the manual mode. In the automatic mode, it is needed to set the playback time in the playback task. In this way, the server performs a timing management on the playback task, and generates the corresponding playback instructions according to the playback task when the playback time has passed and sends the playback instructions to the playback device. In the manual mode, the user activates the playback task via the smart terminal or the webpage. The server can generate the corresponding playback instructions according to the playback task and sends the playback instructions to the playback device. The playback device obtains the content file corresponding to the content file source after receiving the playback instructions and plays the content file.

The playback task can correspond to an account of a user. This task can be customized by the user. For example, the task may be associated with a particular playback device used by the user. Also, the account may be associated with the playback device. The task and the account can be linked to each other indirectly by both being associated with the playback device.

In an example, the playback device can be communicatively coupled to the server via a residential gateway. The residential gateway can be part of the network 110 illustrated in FIG. 1. In FIG. 3, the control server implements the operations 300. At 302, the server obtains the account that is associated with the playback task. In an example, each account can correspond to one residential gateway. Also, when a user selects the program (which may be stored in the server) via a terminal device (such as any one of the devices 102A-102D illustrated in FIG. 1) or a control directly on the playback device, it may be required for the user to login with an account associated with the playback device or the corresponding gateway. The program may be selected through a GUI displayed by a terminal device, such as a webpage. Also, each playback device can be coupled to the server via a residential gateway that is restricted to an account. In such instances, when a connection is negotiated between the residential gateway and the server (so the television can connect with the server), a residential gateway must be indicated as limited to an account permitted by the server. At 304, the server obtains the residential gateway associated with the account. For example, the server queries a predetermined link between the account and the residential gateway to obtain the residential gateway corresponding to the account and playback tasks associated with the account.

The correspondence between the account and the residential gateway may be a link between the account and a device number of the residential gateway, which may be stored in a table such as a hash table. See Table 2.

TABLE 2

| Account | Device number of the residential gateway |
|---|---|
| Asdf123 | 1234567 |
| Axhfkll | 8764900 |
| Cnjfghjl | 2684957 |

At 306, the server determines that the playback device is communicatively coupled to the gateway according to the task. For example, the server can determine that the playback device is communicatively coupled with the residential gateway by a link between the playback device and the playback task.

In an example, a residential gateway of an account may be communicatively coupled to playback device. Thus, after the residential gateway is determined, such as via an account number associated with the playback task, the playback device can become communicatively coupled with the residential gateway. Such an example is beneficial where the association with a playback task is initially made with the television.

In an example, the user may execute the customized playback task manually. For example, in FIG. 4, the control server implements the operations 400, and at 402, may receive a triggering event. The triggering event may be communicated from a terminal device of the user, and the triggering event may include instructions commanding the execution of the playback task. At 404, the server can generate the playback instructions associated with the task according to at least the received triggering event.

Figure 5:
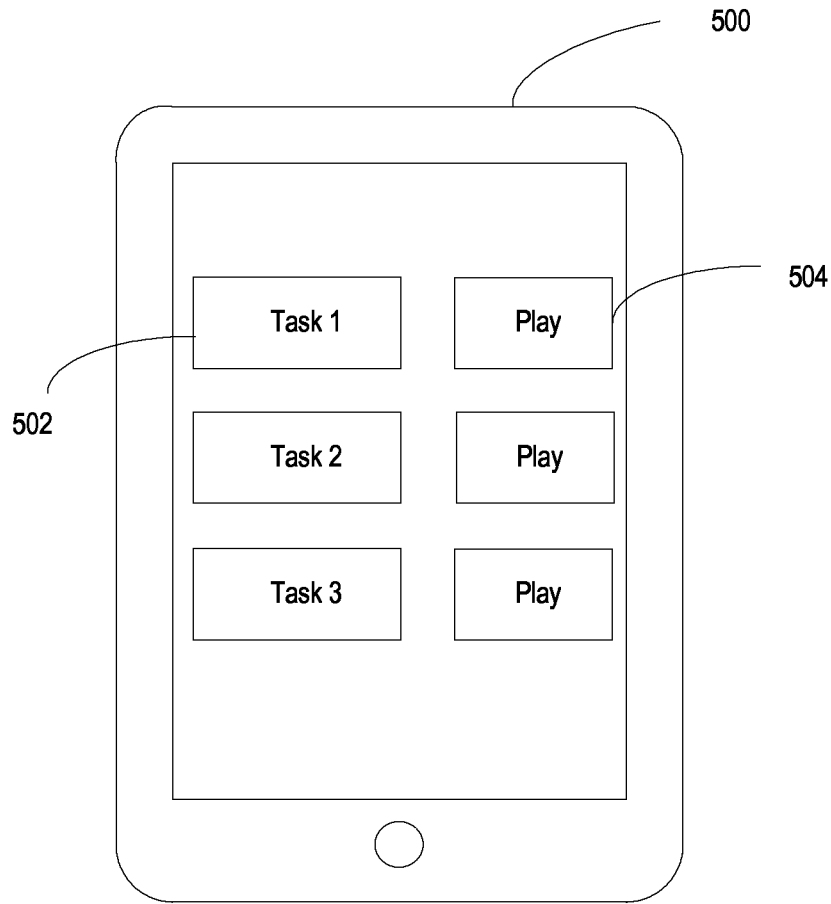
FIG. 5 illustrates an example graphical user interface displayed on a screen of an example smart device (such as the smart phone 102b or the tablet computer 102c illustrated in FIG. 1).

In an example, the user activates the playback task via a corresponding client-side application, such as an application provided through a webpage. For example, FIG. 5 illustrates a graphical user interface of a smart device, such as the smart phone 102b and the tablet computer 102c illustrated in FIG. 1. The GUI of the smart device may display lists playback tasks, such as task 502 and corresponding "playback" buttons 504. A triggering event may include receiving a user selection of a playback button such as button 504. The listed task 502 may also include a name of a program associated with the task. For example, the name or title of a corresponding content file (such as a video file) may be listed.

After receiving the triggering event, the server may also generate the playback instructions according to the playback task. The playback instructions may be configured to control the playback device to obtain a content file corresponding to a content file source of the playback task, and to play the content file. The content file source may be a content server, such as the content server 108 illustrated in FIG. 1.

In an example, the content file source may include scheduling and durations of playback tasks. Also, the content file source may automatically (such as with no human interaction) activate such tasks.

Figure 6:
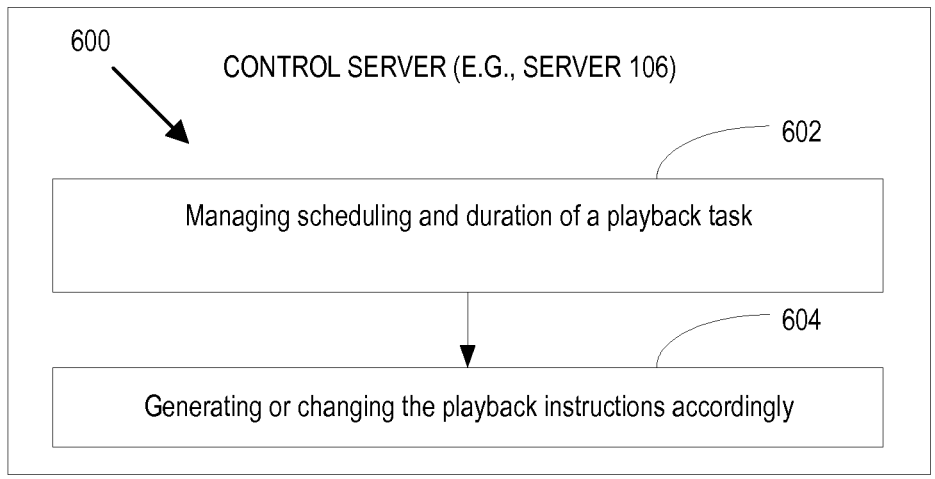
FIGS. 6-11 illustrate flowcharts of example operations associated with a remote control system for a playback device.

For example, in FIG. 6, the control server implements the operations 600, and at 602, may manage scheduling and duration of a playback task. For example, the managing of the scheduling of the playback task may be according to predetermined scheduling and/or duration of the task. A timer of the server can track playback of the play task and can be initiated on the start of the playback by the server. When a playback time has passed on the playback, the task is activated automatically by the server.

For example, the playback time is 10:00 am, and a time when the server obtains the playback task (i.e., the playback task customized by the user) is 8:00 am. After obtaining the playback task, the server calculates an internal length between a task receiving time and the playback time and then starts timing. When the internal length has passed, the server activates the playback task.

Alternatively, after obtaining the playback task, the server treats the playback time as a predetermined time and determines whether the current time reaches the predetermined time. If the current time reaches the predetermined time, the server activates the playback task.

At 604, the control server can generate or change the playback instructions according to the management of the scheduling and duration of the playback task. This can occur when the playback time has passed. Also, when the playback time has passed, the server can generate playback instructions according to the playback task. The playback instructions can be configured to control the playback device or another terminal device, such as anyone of the devices 102A-102D illustrated in FIG. 1. These instructions can control the terminal device to obtain the content file corresponding to the content file source and to play the content file.

For example, the playback instructions may include a playback string including an expected start time, an action such as a playback, a file name, and a link to the file, such as "time: 10:00 am, action: playback, displayName: movie "XXXX", source=movie: //xiaomi/sourceid=10001". The playback instructions indicate that the playback time is 10:00 am; the action is playback; the display name is movie "XXXX"; the source address is "xiaomi/sourceid=10001". This string being part of the playback instructions can be customized by the user in the customization of the playback task. Also, the task can be obtained via the server and the playback task includes at least the content file source. The playback device obtains the content file hosted by the content file source after receiving the playback instructions via the control server. These instructions can also be received via a residential gateway connect to the television.

In an example, the user can program the playback device to play video content at a certain playback time. These programmed instructions can be sent to the control server as input in the generation of a playback task. Such programming the user can occur at any of the terminal devices described herein and the generation of the playback task can occur according to the programming at any of the servers and terminal devices described herein.

Figure 7:
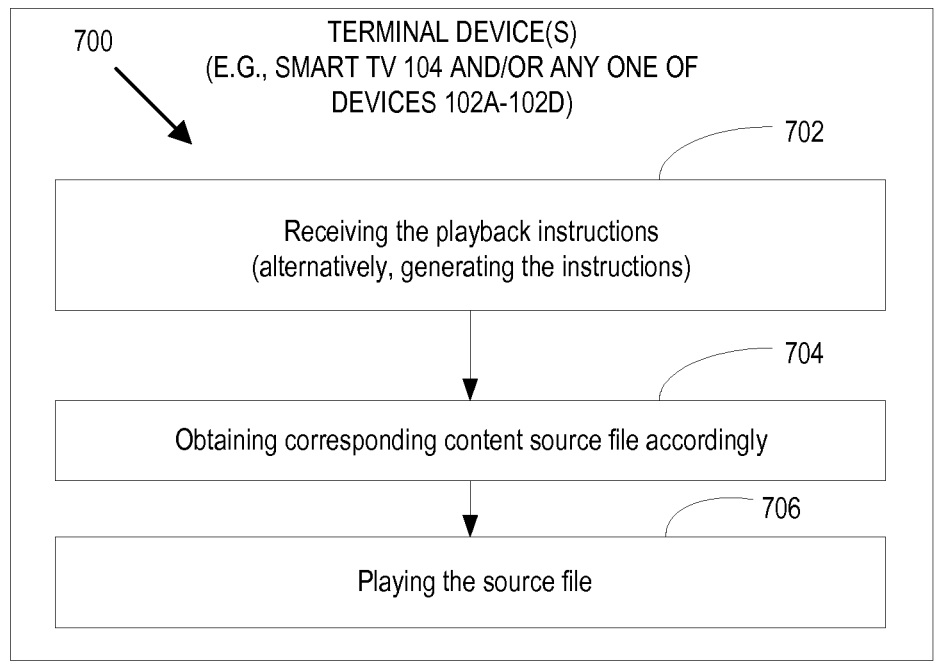

In FIG. 7, one or more terminal devices (such as any one or more of the smart television 104 and the other terminal devices 102A-102D illustrated in FIG. 1) can implement the operations 700, and at 702, may receive the playback instructions generated or changed by the server at 604 of FIG. 6. In such an instance, the control server can generate or change the playback instructions according to the playback task customized by the user. Also, the server can find the residential gateway corresponding to the account of the user and communicate the playback instructions to the residential gateway. The residential gateway can then communicate the playback instructions to the terminal device(s), such as the smart television or at multiple devices so that the playback can occur at multiple locations. At 704, the terminal device(s) can obtain the content file (such as a video file) corresponding to the content file source, such as a content server, according to the playback instructions. For example, after receiving the playback instructions with a playback string such as "time: 10:00 am, action: playback, displayName: movie "XXXX", source=movie: //xiaomi/sourceid=10001", the playback device enters a playback program and the playback program obtains the content file with the corresponding video content and the corresponding the playback content source, which is "//xiaomi/sourceid=10001" in this instance. At 706, the content file is played by the terminal device(s). For example, after obtaining the content file corresponding to the content file source in the playback instructions, the television plays the content file.

In an example, the playback device receives the playback instructions generated or changed by the server according to the playback task. These instructions can be received via the gateway and/or the remote control or any other terminal device described herein. The playback device or any of the aforementioned technologies can then obtain the content file corresponding to the content file source according to the content file source in the playback instructions. The playback device can then play the video content of the content file. Also, a user, such as through logging into a corresponding account, can customize the playback task through an easy to use graphical user interface and/or by directly changing a corresponding playback string of the task instructions. For instance, this can allow a user to control the terminal device to play the content of the content file at a selected time at the terminal device performing the playback or at a remote terminal device communicatively coupled to the terminal device performing the playback.

In an example, to play the content of the content file at a selected time (whether selected at a remote device or the actual playback device), the mode of operation of the playback device may affect the procedure for retrieving and playing the content.

Figure 8:
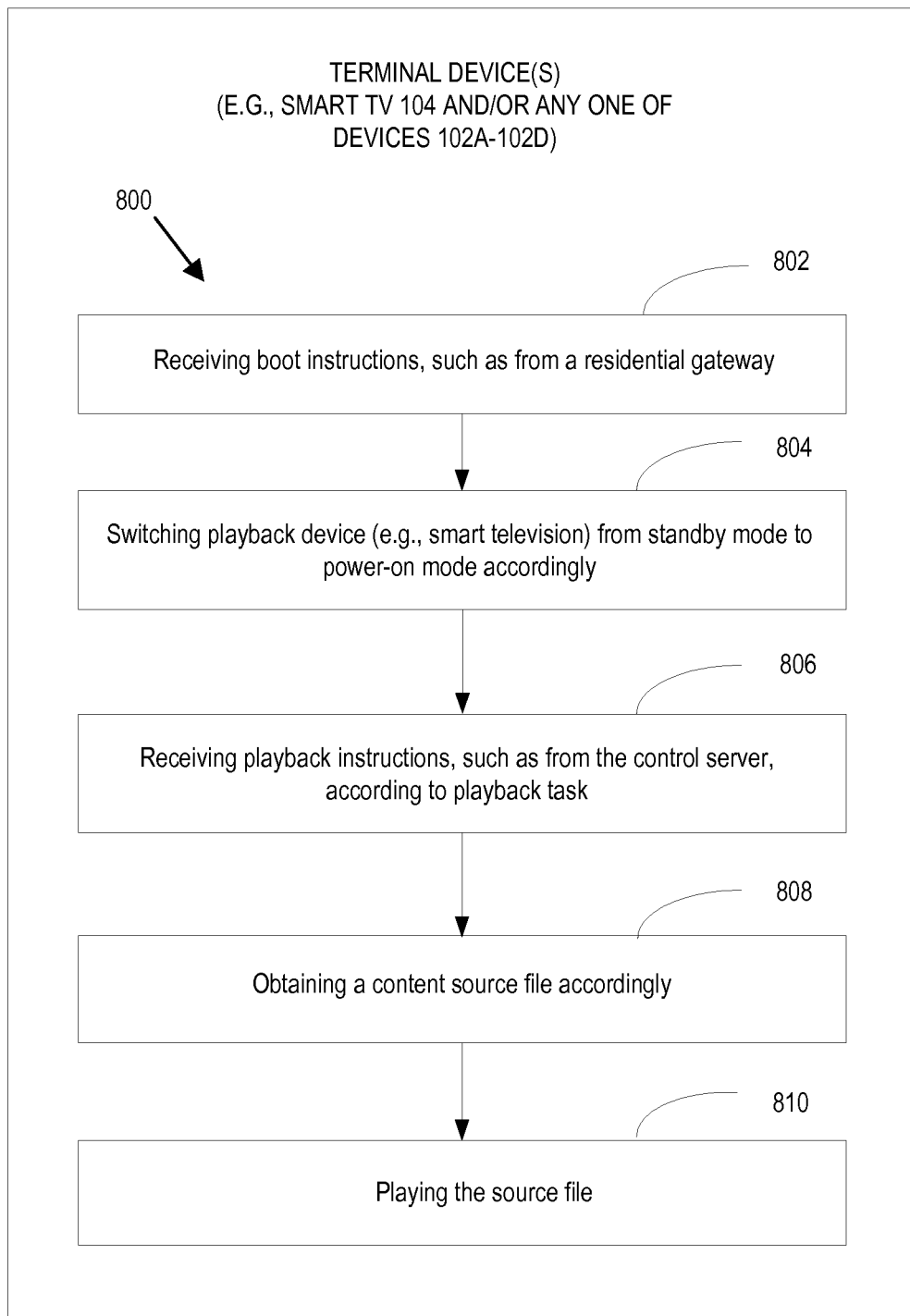

For example, in FIG. 8, one or more terminal devices (such as any one or more of the smart television 104 and the other terminal devices 102A-102D illustrated in FIG. 1) can implement the operations 800, and at 802, may receive boot instructions, such as from a residential gateway. For instance, boot instructions from the residential gateway are received, in which the boot instructions are generated by the residential gateway when receiving playback instructions from a control server. In an example, boot instructions are received only when the device performing the playback is reported to be or determined to be in standby mode. Receiving of such a report or such a determination can be made at the gateway or a remote control device to the device performing the playback. In such an example and other examples described herein, the device performing the playback and the remote control device may be any combination of terminal devices capable of such functionality. For example, the device performing the playback may be anyone of the smart television 104 and devices 102A-102D of FIG. 1. Also, the remote control device may be any one of the devices 102A-102D. The remote control device may even be the smart television 104 controlling playback at anyone of the devices 102A-102D. This last example may be useful when testing playback at one of the devices 102A-102D, and only the smart television 104 is available—for whatever reason—to act as the remote control.

At 804, the smart television, or any other terminal device acting as the device to perform the playback (the playback device), is switched from the standby mode to a power-on mode according to the boot instructions. The boot instructions may be communicated by a direct and/or short range wireless signal (e.g., any one of direct signals 103a-103c of FIG. 1). A direct and/or short range wireless signal may be an infrared signal or a Bluetooth signal, for example. The boot instructions may also be communicated by a network communicated signal, such as a signal communicated via a LAN and/or a WAN (e.g., any one of network communicated signals 105a-105e of FIG. 1).

After receiving the boot instructions, such as from the gateway, the playback device is switched from the standby mode to the power-on mode at 804. The standby mode of the playback device may be a mode in which the playback device is turned off, but a wireless receiving device therein is in the standby mode. In such an instance, the wireless receiving device can receive a wireless control signal to control the mode of the playback device. At 806, the playback instructions, such as when generated by the server, can also be received by either the remote control device or the playback device. At 808, the content file (such as a video file) is obtained by the playback device according to the playback instructions. For example, the playback device may receive the content file via the remote control device, which as an intermediate node between the playback device and the content file source hosting the content file. At 810, the playback device plays the content file.

Figure 9:
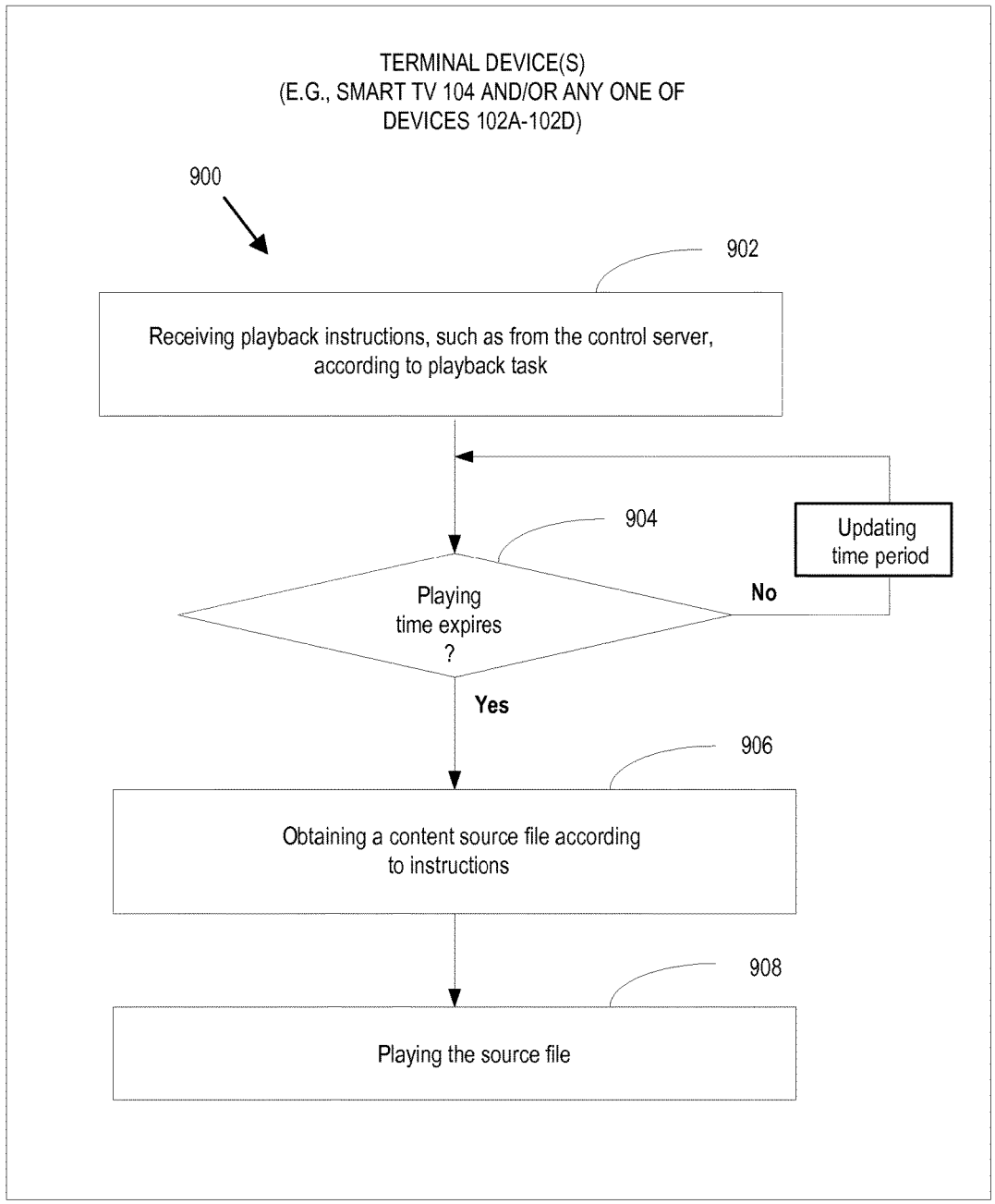

Additionally, for example, the playback device (such as the smart television) can play the predetermined program of the playback instructions at a predetermined time. For example, in FIG. 9, one or more terminal devices (such as any one or more of the smart television 104 and the other terminal devices 102A-102D illustrated in FIG. 1) can implement the operations 900, and at 902, may receive playback instructions, such as from the control server, according to a playback task. In an example, the terminal device(s) may perform time management for the playback instructions. At 904, from at least the playback instructions and a timer, it is determined whether playing time of the corresponding video content has passed. The server can generate the playback instructions with a playback time, in such an example. After receiving the playback instructions, the terminal device can perform timing management with respect to the playback instructions. This can occur, for example, when the playback device is in a power-on mode. If it is determined that the playback time is has passed, then the terminal device(s) obtain a content file (such as a video file) according the playback instructions at 906. If the playback time is not reached or has passed, the time at the time of this determination is used to update the playback time. For example, the time the last determination can replace the time for the playback time or at least influence the replacement time. Upon replacement of the playback time, the operations 900 can return to determining whether the playback time has passed. This repeating of checking whether the playback time has passed can occur periodically at a variety of different frequencies. At 904, the content file is played by the playback device. Since the terminal device can perform the time management for tasks, it is not required to perform such management at the control server. This can save processing and memory related resources at the server. A device of the residential gateway can also perform this time management. This delegation of the gateway can also relieve data processing resources of the control server.

Figure 10:
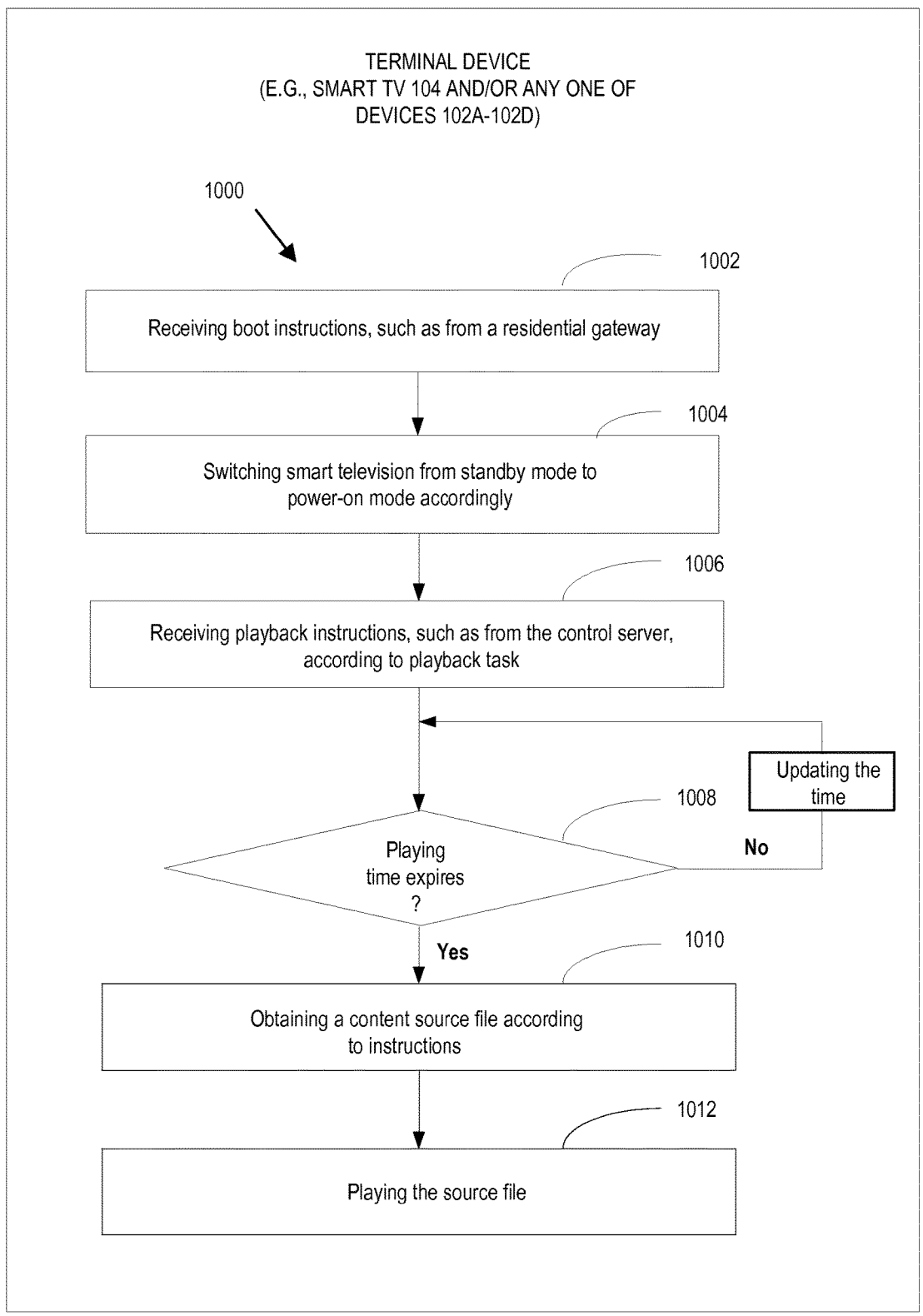

Additionally, in FIG. 10, one or more terminal devices (such as any one or more of the smart television 104 and the other terminal devices 102A-102D illustrated in FIG. 1) can implement the operations 1000, and at 1002, may receive boot instructions, such as from a residential gateway. At 1004, the smart television, or any other terminal device acting as the device to perform the playback (the playback device), is switched from the standby mode to a power-on mode according to the boot instructions. At 1006, the playback instructions, such as when generated by the server, can also be received by either the remote control device or the playback device. Likewise, the instructions can be received according to the playback task. Additionally, the playback instructions can include a playback time. At 1008, from at least the playback instructions and a timer, it is determined whether playing time of the corresponding video content has passed. If it is determined that the playback time is has passed, then the terminal device(s) obtain a content file (such as a video file) according the playback instructions at 1010. If the playback time is not reached or has passed, the time at the time of this determination is used to update the playback time. Upon update of the playback time, the operations 900 can return to determining whether the updated playback time has passed. A repeating of checking whether the playback time has passed can occur periodically at a variety of different frequencies. At 1012, the content file is played by the playback device. In this example, the terminal device(s) are controlled to switch to the power-on mode from the standby mode to receive the playback instructions. This can even occur when the instructions are generated and received via the residential gateway. Thus the playback device can be controlled to play the predetermined program at the predetermined time accordingly, even when the terminal device(s), such as the playback device, in a standby mode.

Figure 11:
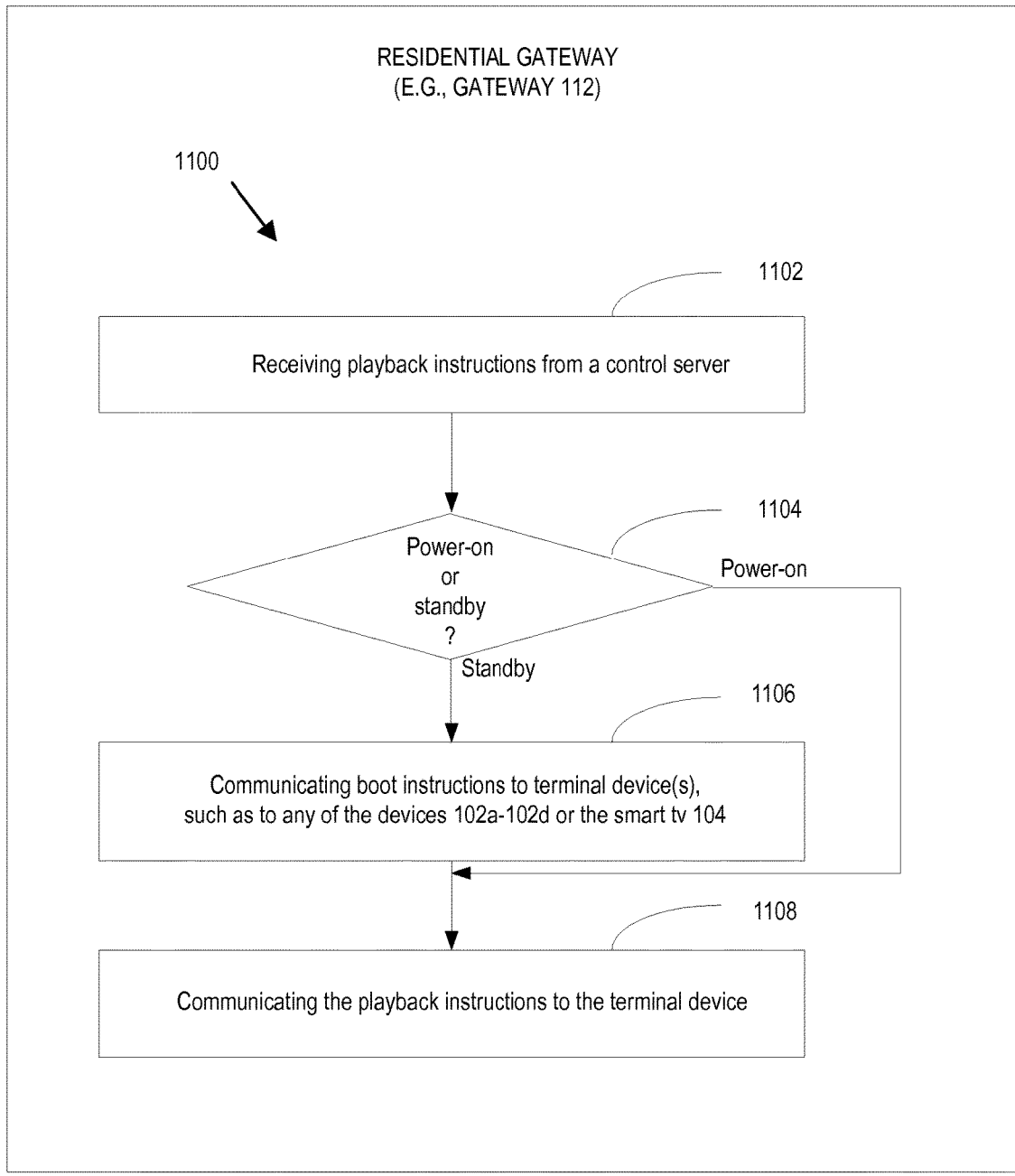

In FIG. 11, a residential gateway, such as the gateway 112 of FIG. 1, can implement the operations 1100, and at 1102, may receive the playback instructions, described herein, from a control server (such as the control server 106). In such an example, the playback instructions can include at least the content file source. Also, the playback instructions may include an playback time, an action (such a playing of the corresponding video content), a title of the content or a name of the corresponding content file (such as a video file), and a content file source. At 1104, the gateway can determine whether a terminal device, indicated for receiving the instructions, is in the power-on mode or the standby mode. This determination can occur by communicating a testing signal to the playback device or a remote control device communicatively coupled to the playback device. The remote control device can relay the testing signal to the playback device and relay corresponding feedback from the playback device to the gateway.

Where it is determined that the terminal device(s), such as the smart television, is in a standby mode, the boot instructions are sent to the terminal device(s), in which the boot instructions are configured to control the playback device of the terminal device(s) to switch to the power-on mode from the standby mode at 1106. After the boot instructions are received by the terminal device(s), the playback instructions are communicated to the terminal device(s) at 1108. In an example, intermediate devices, such as a remote control device of the playback device, can be switch to the power-on mode from the standby mode. The terminal device(s) can be switched to the power-on mode serially or in parallel. Where that gateway determines that the terminal device(s) are in a power-on mode, the playback instructions are communicated to the terminal device(s) at 1108.

In this example, if the residential gateway detects a playback device, such as a smart television, is in a standby mode, the playback device is controlled to switch to the power-on mode. Then, the residential gateway can communicate the playback instructions sent from a sever to the playback device, such that the playback device obtains a content file corresponding to the content file source. All of which can be according to the playback instructions. The television can then play the content file, and thus the playback device can be controlled to play the predetermined program at the predetermined time even when the playback device was initially in the standby mode.

FIGS. 12-17 illustrate block diagrams of example arrangements of circuitries associated with a remote control system for a playback device (such as a smart television), and each of these circuitries can be configured to perform at least one of the operations illustrated in FIGS. 2-4 and 6-11.

Figure 12:
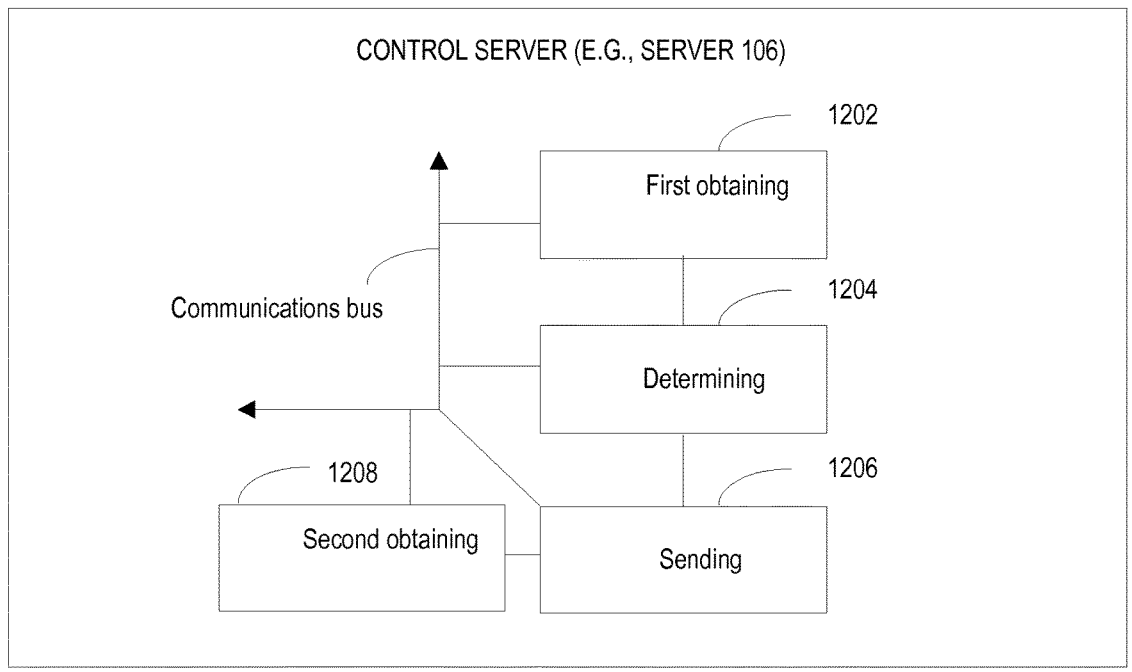
FIGS. 12-17 illustrate block diagrams of example arrangements of circuitries associated with a remote control system for a playback device, and each of these circuitries can be configured to perform at least one of the operations illustrated in FIGS. 2-4 and 6-11.

Specifically, FIG. 12 illustrates a block diagram of an arrangement of circuitries in a control server (such as the control server 106 illustrated in FIG. 1) associated with a remote control device of a playback device, and a remote control device of a playback device may be implemented by any one of the devices 102A-102D illustrated in FIG. 1, for example. The control server includes first obtaining circuitry 1202, determining circuitry 1204, second obtaining circuitry 1206, and communications circuitry 1208. The first obtaining circuitry 1202 can be configured to obtain the playback task customized by the user, in which the playback task includes at least a content file source. The determining circuitry 1204 can be configured to determine the playback device associated with the playback task. In an example, the playback device is communicatively coupled to the control server via a residential gateway (such as the residential gateway device 112 illustrated in FIG. 1) and the determining circuitry 1204 includes first obtaining sub-circuitry, querying sub-circuitry and first determining sub-circuitry. The first obtaining sub-circuitry can be configured to obtain an account associated with the playback task. This account can correspond to the residential gateway device. The querying sub-circuitry can be configured to query a predetermined association between the account and the residential gateway device to identify the appropriate residential gateway device to use. The first determining sub-circuitry can be configured to determine the playback device communicatively coupled with the residential gateway device, the playback device being associated with a playback task.

The second obtaining circuitry 1206 can be configured to obtain playback instructions corresponding to the playback task. In an example, the second obtaining circuitry 1206 includes a receiving sub-circuitry and first instructions generating sub-circuitry. The receiving sub-circuitry can be configured to receive a triggering even of the user for activating the playback task. The first instructions generating sub-circuitry can be configured to generate the playback instructions corresponding to the playback task according to the triggering event.

The communications circuitry 1208 can be configured to communicate the playback instructions to the playback device, such as via the remote control device. The playback instructions are configured to control the playback device to obtain a content file corresponding to a content file source (such as the content server 108). The playback device can then play a content file (such as a video file) received from the content file source. The playback task can include a playback time and a content file source. Also, the playback task can be in an automatic mode where the server activates the playback task according to the playback time automatically. The second obtaining circuitry 1206 can include a timing sub-circuitry and second instructions generating sub-circuitry. The timing sub-circuitry can be configured to perform the timing management on the playback task according to the playback time of the playback task. The second instructions generating sub-circuitry can configured to generate the playback instructions corresponding to the playback task according to the playback task and when the playback time has passed.

In an example, the first obtaining circuitry 1202 obtains a playback task customized by the user, in which the playback task includes at least the content file source. Then, the determining circuitry 1204 determines the playback device associated with the playback task. After the second obtaining circuitry 1206 obtains the playback instructions corresponding to the playback task, the communications circuitry 1208 can communicate the playback instructions to the playback device. After receiving the playback instructions, the playback device obtains the content file corresponding linked to a content file source, and once received from the source can play the content file. Also, the playback device can be controlled by the control server and/or the remote control device to play the video content of the content file at a predetermined time. This control can be done manually and/or automatically with no human interaction.

Figure 13:
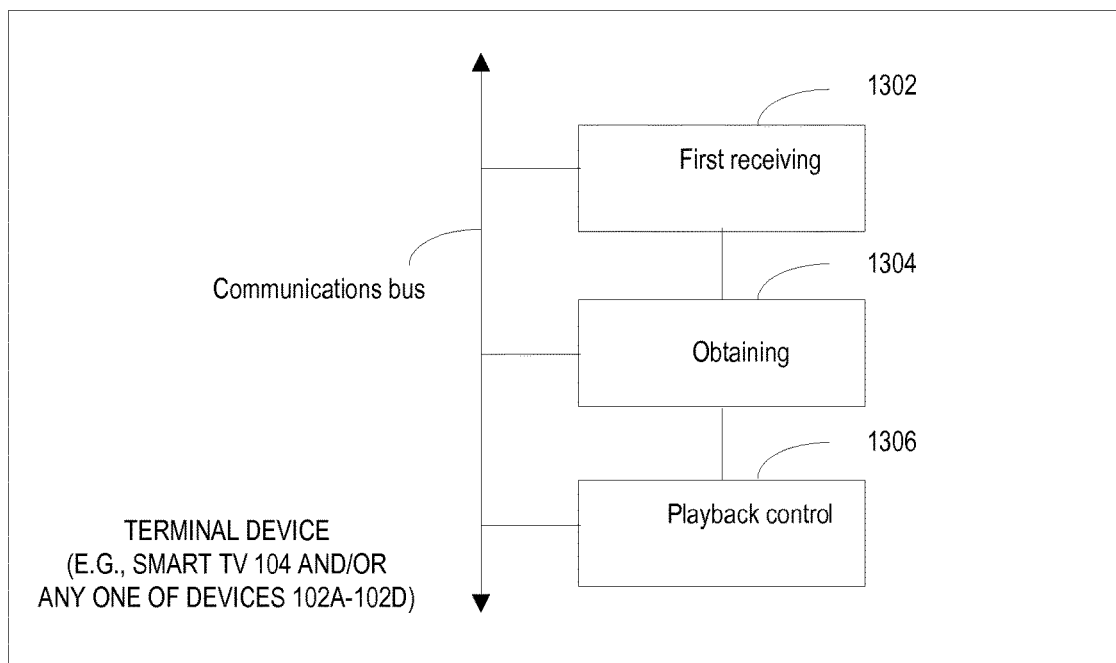

Specifically, FIG. 13 illustrates a block diagram of an arrangement of circuitries in a terminal device acting as the playback device (such as the smart television 104 and/or any one of the devices 102A-102D when such devices are acting as the playback device). This illustrated playback device includes a first receiving circuitry 1302, obtaining circuitry 1304, and playback control circuitry 1306. The first receiving circuitry 1302 can be configured to receive the playback instructions generated by a control server according to an obtained playback task. The obtaining circuitry 1304 can be configured to obtain a content file (such as a video file) corresponding to the content file source, according to a playback instructions. The playback control circuitry 1306 can configured to play video content of the content file. In such an example, a remote control device for the playback device (such as a smart television), the first receiving circuitry 1302 can receive the playback instructions generated by the server according to the obtained playback task, and the obtaining circuitry 1304 can the content file linked to the content file source, according to the playback instructions. Finally, the playback control circuitry 1306 plays the content file. In such an example, a user can customize the playback task to generate the customized playback instructions. The playback device can obtain the playback instructions and execute the playback instructions. Finally, the user can control the playback device to play the video content at a predetermined time remotely via the remote control device.

Figure 14:
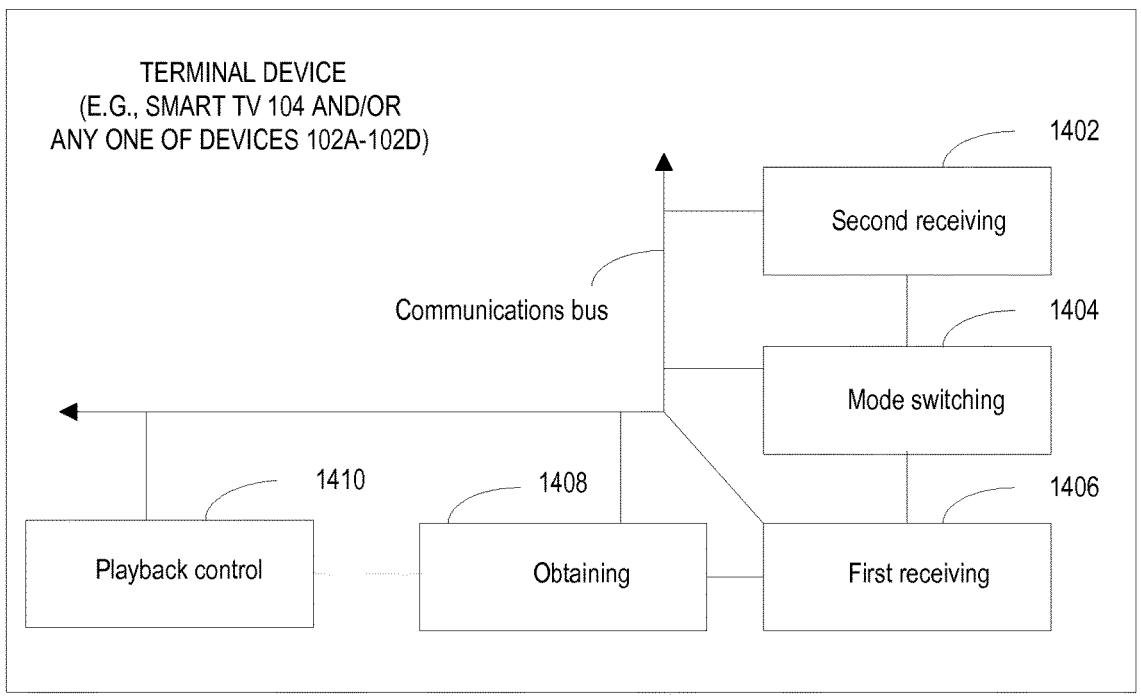

FIG. 14 illustrates a block diagram of an arrangement of circuitries in a terminal device acting as the playback device (such as the smart television 104 and/or any one of the devices 102A-102D when such devices are acting as the playback device). This illustrated playback device includes second receiving circuitry 1402, mode switching circuitry 1404, first receiving circuitry 1406, obtaining circuitry 1408, and playback control circuitry 1410. The second receiving circuitry 1402 can be configured to receive boot instructions from a residential gateway (such as the gateway 112). The gateway can generate the boot instructions upon receiving playback instructions from a control server and determining that a playback device (such as a smart television) is in a standby mode. The mode switching circuitry 1404 can be configured to switch the playback device from the standby mode to a power-on mode according to the boot instructions. The first receiving circuitry 1406 can be configured to receive the playback instructions generated by the control server, according to an obtained playback instructions. The obtaining circuitry 1408 can be configured to obtain a content file (such as a video file) corresponding to a content file source according indicated in the playback instructions. The playback control circuitry 1410 can be configured to play the content file. A remote control device for the playback device can receive the boot instructions from the residential gateway via the second receiving circuitry 1402. This can occur when the playback device is in a standby mode. The mode switching circuitry 1404 can then switch the playback device to a power-on mode according to the boot instructions. The playback device can then receive the playback instructions. The playback device can also obtain the content file from the content file source according to the playback instructions. Thus, the playback device can be controlled to play video content of the content file at a predetermined time even when the playback device is in a standby mode.

Figure 15:
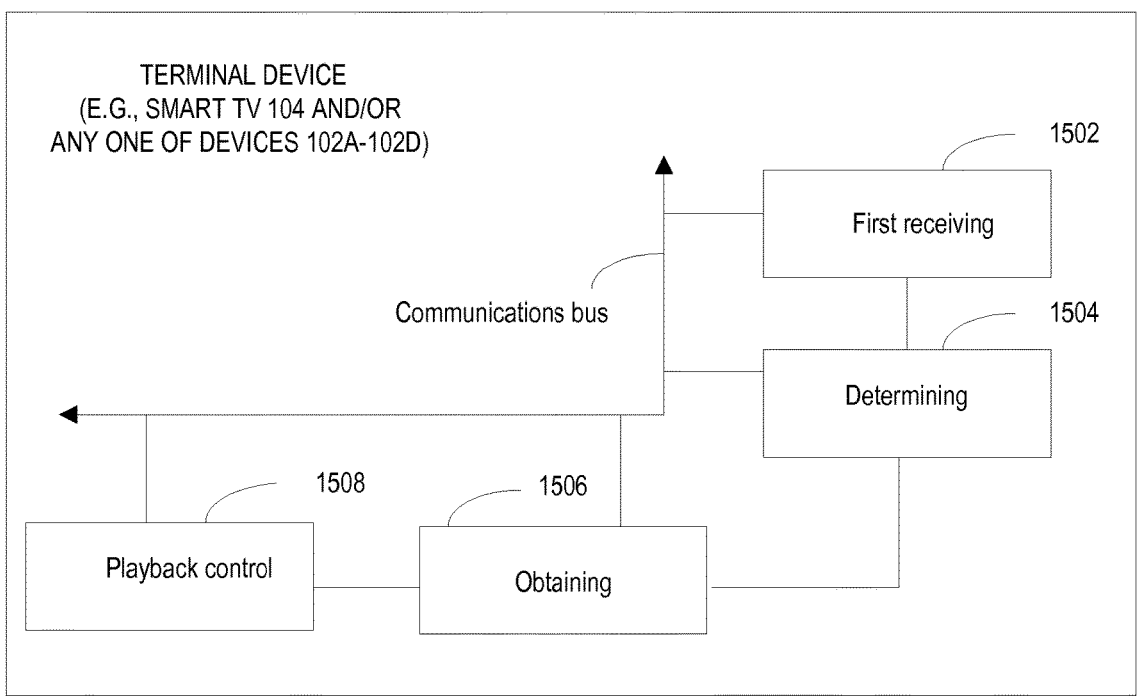
Figure 16:
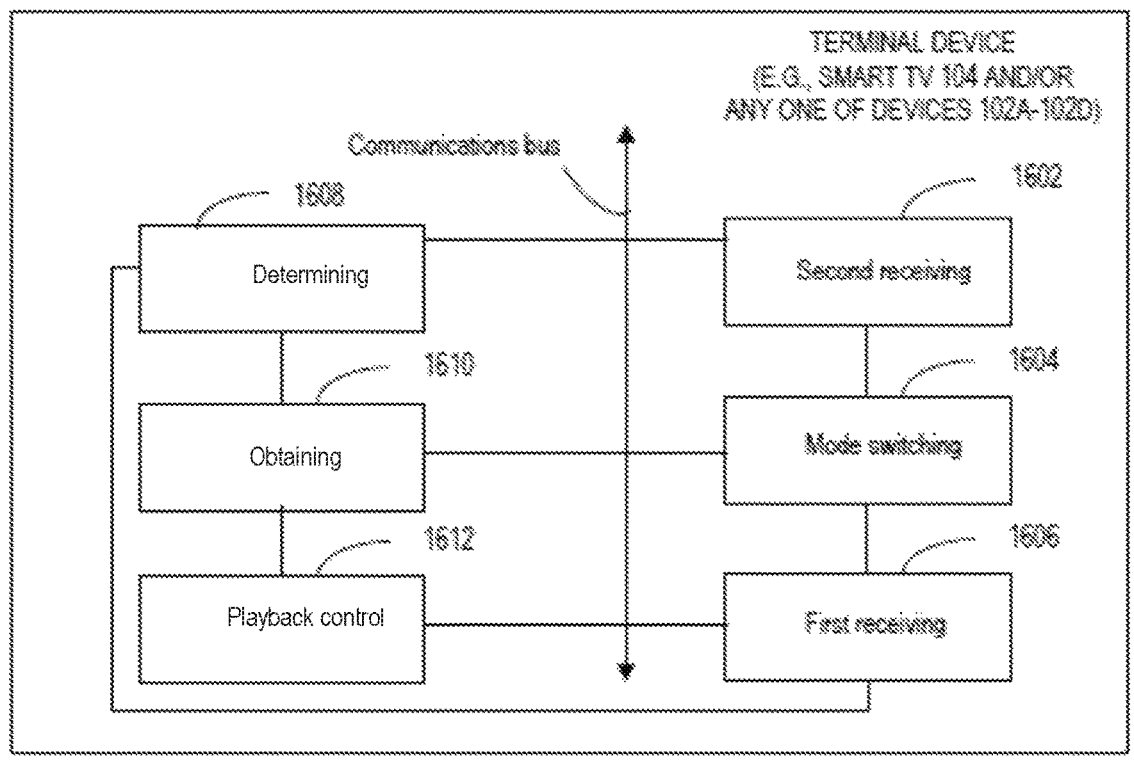

FIG. 15 illustrates a block diagram of an arrangement of circuitries in a terminal device acting as the playback device (such as the smart television 104 and/or any one of the devices 102A-102D when such devices are acting as the playback device). This illustrated playback device includes first receiving circuitry 1502, determining circuitry 1504, obtaining circuitry 1506, and playback control circuitry 1508. The first receiving circuitry 1502 can be configured to receive playback instructions generated by a control server according to an obtained playback task. The determining circuitry 1504 can be configured to determine whether playback time of a corresponding playback task has passed. The obtaining circuitry 1506 can be configured to obtain a content file (such as a video file) of a content file source according to the playback instructions if the playback time is has passed. The playback control circuitry 1508 can be configured to play the content file. The playback device can perform time management for the playback instructions. When the determining circuitry 1504 determines the playback time has passed, the playback device can obtain the content file and play it. In such an example, it is not required for the control server to perform the time management for each playback task, thus reducing the use of processing resources of the server, FIG. 16 illustrates a block diagram of an arrangement of circuitries in a terminal device acting as the playback device (such as the smart television 104 and/or any one of the devices 102A-102D when such devices are acting as the playback device). This illustrated playback device includes second receiving circuitry 1602, mode switching circuitry 1604, first receiving circuitry 1606, determining circuitry 1608, obtaining circuitry 1610, and playback control circuitry 1612. The second receiving circuitry 1602 can be configured to receive boot instructions from a residential gateway, in which the boot instructions are generated by the residential gateway when receiving the playback instructions from a control server. This can also occur when the gateway determines that the playback device is in a standby mode. The mode switching circuitry 1604 can be configured to switch the playback device from the standby mode to a power-on mode according to the boot instructions. The first receiving circuitry 1606 can be configured to receive the playback instructions generated by the server according to playback instructions, in which the playback instructions includes the content file source. The determining circuitry 1608 can be configured to determine whether playback time has passed. The obtaining circuitry 1610 can be configured to obtain a content file (such as a video file) from a content file source according to the playback instructions if the playback time has passed. The playback control circuitry 1612 can be configured to play the content file. A remote control device can control the playback device to switch from the standby mode to a power-on mode using playback instructions sent from and generated by the control server. The playback instructions can also be sent through a residential gateway communicatively coupled to the remote control. Also, the playback device can perform time management for the playback instructions. If the playback time has passed, the playback device obtains the content file from the content file source and plays the content file; and thus, the playback device can be controlled by the remote control to play video content at scheduled time even when the playback device is in the standby mode.

Figure 17:
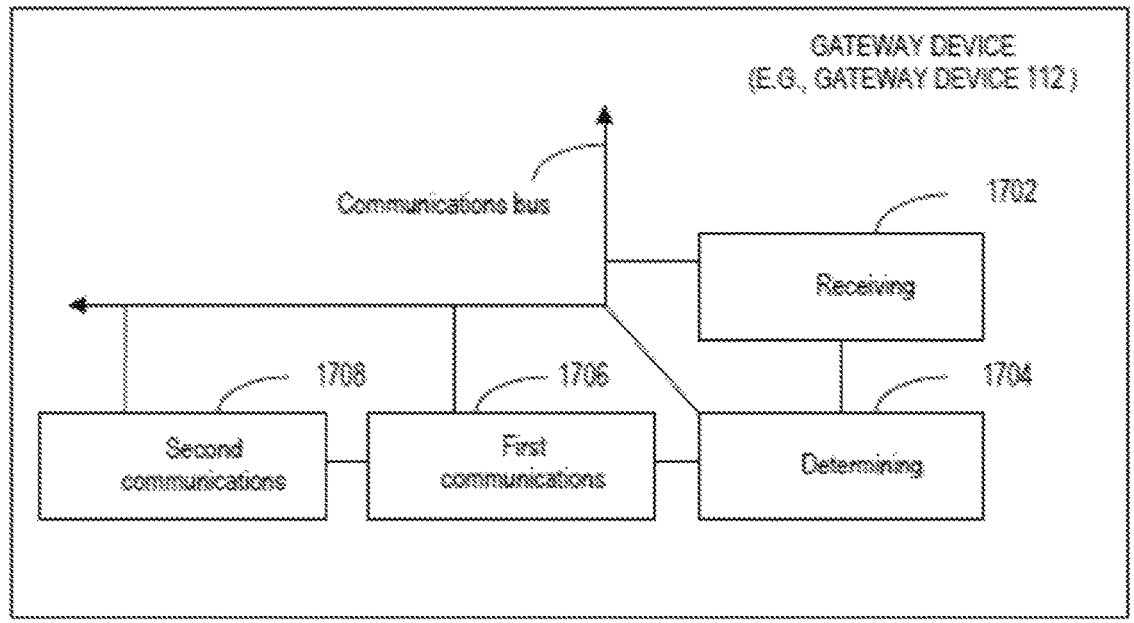

FIG. 17 illustrates a block diagram of an arrangement of circuitries in a residential gateway device (such as the gateway device 112 illustrated in FIG. 1). This illustrated gateway device includes receiving circuitry 1702, determining circuitry 1704, first communications circuitry 1706, and second communications circuitry 1708. The receiving circuitry 1702 can be configured to receive playback instructions from a control server. The determining circuitry 1704 can be configured to determine whether the playback device is in a power-on mode or a standby mode. The first communications circuitry 1706 can be configured to communicate the boot instructions to the playback device if the payback device is in the standby mode. The boot instructions can be configured to control the payback device to switch to the power-on mode from the standby mode. The second communications circuitry 1708 can be configured to transmit the playback instructions to the playback device, in which the playback instructions include a playback time and a content file source. When detecting that the playback device is in the standby mode, the residential gateway can control the playback device to switch to the power-on mode. The residential gateway can then communicate the playback instructions, sent from the server to the playback device, such that the playback device can obtain the content file from the content file source according to the playback instructions. The playback device can then play the content file.

Figure 18:
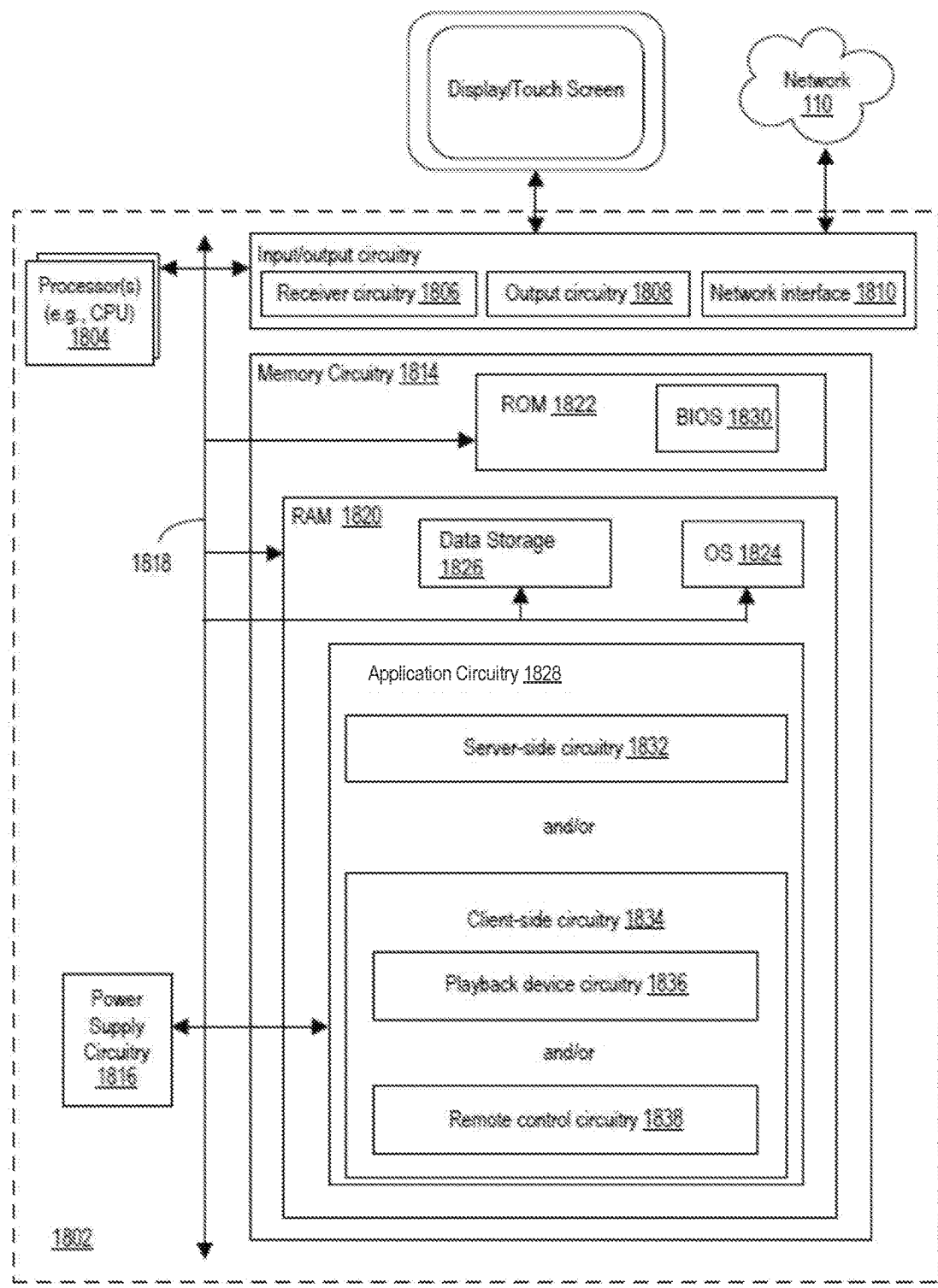
FIG. 18 illustrates an example electronic device, such as a device that can function as any one of the servers of FIG. 1 and/or any one of the client-side devices of FIG. 1.

FIG. 18 illustrates an example electronic device, such as a device that can function as any one of the servers of FIG. 1 and/or any one of the client-side devices of FIG. 1 (such as the smart television or any one of the devices 102A-102D). For instance, the device 1802 may be a mobile device (such as a smartphone or a tablet), a personal computer, a server computer, a digital broadcast terminal (such as a smart TV), a messaging device, a gaming console, a medical device, exercise equipment, and a personal digital assistant, for example. The device 1802 includes a processor 1804, input/out circuitry (such as receiver circuitry 1806), and output circuitry 1808. The input/output circuitry also includes a network interface 1810. The device 1802 also includes memory circuitry 1814, power supply circuitry 1816, and a communications bus 1818 that connects the aforementioned elements of the device.

The processor 1804 can be any type of data processing device, such as a central processing unit (CPU). In an example, the processor 1804 can include multiple processors (such as a configuration of a primary CPU and co-processors). The device 1802 may also include or at least connect to a display and a touchscreen or another technology for facilitating user input.

The memory circuitry 1814, which can include random access memory (RAM) The playback device circuitry 1836 can implement any and all of the features described herein associated with a terminal device when it is functioning as a playback device. 1820 or read-only memory (ROM) 1822, can be enabled by various types of known memory devices. The RAM 1820 can store data and instructions defining an operating system 1824, data storage 1826, and application circuitry 1828. Although in FIG. 18 the application circuitry is depicted as a part of the RAM 1820, in these examples and others, the application circuitry may include hardware (such as microprocessors), firmware, software, or any combination thereof. The ROM 1822 can include basic input/output system (BIOS) 1830 of the electronic device 1802. Aspects of the memory circuitry 1814 can store various types of data to support operations of the device 1802, such as in the data storage circuitry 1826. Examples of such data include instructions for any applications or operations of the device 1802, messages, pictures, and video. Aspects of the memory circuitry 1814 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), such as ROM 1822, a magnetic memory, a flash memory, a magnetic or optical disk, or any combination thereof.

The input/output components can include the interfaces for facilitating communication between any components of the electronic device 1802, end users, and components of external devices (such as a digital camera, a digital video recorder, a display, or components of other devices of a network such a network 110 illustrated in FIG. 1). For example, such components can include a network card that is an integration of a receiver, a transmitter, and I/O interfaces. The I/O components, can include user interfaces such as monitors, keyboards, touchscreens, microphones, and speakers. Further, some of the I/O components and the bus 1818 can facilitate communication between components of the electronic device 1802, and can ease processing performed by the processor 1804.

Multimedia devices included in or associated with the device 1802 may include a screen providing an output interface between the device and a user. In some examples, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some examples, an included multimedia device may include a front camera and/or a rear camera. The front camera and/or the rear camera may receive an external multimedia datum while the device 1802 is in an operation mode, such as a photographing mode or a video mode. Each of the front camera and the rear camera may be a fixed optical lens system or have focus and optical zoom capability. The multimedia devices may include an audio component configured to output and/or input audio signals. For example, an audio component may include a microphone configured to receive an external audio signal when the device 1802 is in an operation mode, such as a call mode, a recording mode, and a voice recognition mode. The received audio signal may be further stored in a part of the memory circuitry 1814 or transmitted via the network interface 1810. In some examples of the device 1802, a speaker may be included.

The depicted input/output circuitry of the device 1802 may provide an interface between the processor 1804 and peripheral interface components, such as a keyboard, a click wheel, an buttons, for example. The buttons may include a home button, a volume button, a starting button, and a locking button.

The network interface 1810 can include a receiver and a transmitter (or a transceiver), and an antenna for wireless communications. The network interface 1810 may be configured to facilitate communication, wired or wirelessly, between the device 1802 and other devices. The device 1802 can access a wireless network based on a communication standard, such as WiFi, 2G, or 3G, or a combination thereof. In an example, the network interface 1810 may receive a broadcast signal or broadcast associated information from an external broadcast management system via a broadcast channel. Also, the network interface 1810 may include a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

The power supply circuitry 1816 contains power components, and facilitates supply and management of power to the electronic device 1802. The power supply circuitry 1816 may provide power to various components of the device 1802. The power supply circuitry 1816 may include a power management system, one or more power sources, and any other components associated with the generation, management, and distribution of power in the device 1802.

The aspects of the device 1802 described herein may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components. Also, aspects may be provided by a non-transitory computer-readable storage medium including instructions, such as included in the memory circuitry 1814, executable by the processor 1812, for performing operations described herein. For example, the non-transitory computer-readable storage medium may be a ROM, a RAM, a CD-ROM, a magnetic tape, a floppy disc, an optical data storage device, or any combination thereof.

In an example, an I/O component of the device 1802, receiver circuitry 1806, can be configured to receive image data of an image to be segmented including a background and a face of a person in a foreground. The image data can include data representative of a plurality of pixels of the image and a positioning result of a plurality of exterior contour points of the face. The output circuitry 1808 can be configured to communicate the image with the segmented plurality of pixels to display circuitry.

The application circuitry 1828 is communicatively coupled to the receiver circuitry 1806 and the output circuitry 1808. The application circuitry 1828 can include server-side circuitry 1832 and/or client-side circuitry 1834. The client-side circuitry 1834 can include playback device circuitry 1836 and/or remote control circuitry 1838. The server-side circuitry 1832 can implement any and all of the features described herein (such as any and all of the operations or circuitries) associated with a control server (such as control server 106) and/or a content server (such as content server 108). The client-side circuitry 1834 can implement any and all of the features described herein associated with a terminal device (such as smart television 104 and devices 102A-102D). The playback device circuitry 1836 can implement any and all of the features described herein associated with a terminal device when it is functioning as a playback device. The remote control circuitry 1838 can implement any and all of the features described herein associated with a terminal device when it is functioning as a remote control device.

The invention claimed is:

1. A method, comprising:
receiving, at a processor, a playback task customized by a user, the playback task including a content file source and playback instructions, and the content file source including a content server, wherein the playback task further comprises a playback time, a corresponding mode of operation, and a number of content parts;
identifying, by the processor, an account associated with the playback task;
identifying, by the processor, a residential gateway device associated with the account;
determining, by the processor, a playback device corresponding to the playback task, the playback device communicatively coupled to the content server via the residential gateway device;
determining, by the processor, that the playback device is communicatively coupled with the residential gateway device;
performing timing management, by the processor, on the playback task according to the playback time and the number of content parts; and
communicating, by a communications interface communicatively coupled to the processor, the playback instructions to the playback device, the playback instructions configured to: control the playback device to obtain a content file from the content server via the residential gateway device, and control the playback device to play the content file.

2. The method of claim 1, further comprising:
receiving, at the processor, a trigger signal indicative of a triggering event from a user interface of a remote control device, the trigger signal at least configured to activate the playback task; and generating the playback instructions according to the trigger signal.

3. The method of claim 1, wherein the processor is part of a remote control device communicatively coupled to the playback device wirelessly.

4. The method of claim 3, wherein the remote control device is implemented on a tablet computer or smart phone.

5. The method of claim 3, wherein the playback device is a smart television, and wherein the remote control device is a smart television remote control.

6. The method of claim 3, wherein the playback device acts as a remote control device for another playback device.

7. The method of claim 1, wherein the method further comprises:
generating the playback instructions according to the playback task when the playback time has passed.

8. The method of claim 1, wherein the content file includes a video file.

9. The method of claim 1, wherein the playback device is a smart television.

10. The method of claim 1, wherein the playback device is a tablet computer.

11. The method of claim 1, wherein the playback device is a smart phone.

12. The method of claim 1, wherein the playback device is a remote control of a smart television.

13. A remote control device, comprising:
a user interface;
circuitry configured to receive a trigger signal indicative of a triggering event from the user interface, the trigger signal at least configured to activate a playback task customized by a user, wherein the playback task further comprises a playback time, a corresponding mode of operation, and a number of content parts;
circuitry configured to generate playback instructions of the playback task according to the trigger signal, the playback task also including a content file source;
circuitry configured to determine a playback device and a residential gateway device corresponding to the playback task, the playback device and the remote control device communicatively coupled wirelessly, and the playback device and the residential gateway device communicatively coupled wirelessly, via a wired line, or both;
circuitry configured to perform timing management on the playback task according to the playback time and the number of content parts; and
a communications interface configured to communicate the playback instructions to the playback device, wherein the playback instructions are configured to: control the playback device to obtain a content file from the content file source via the residential gateway device, and control the playback device to play the content file.

14. The remote control device of claim 13, wherein the remote control device is implemented on a tablet computer or smart phone.

15. The remote control device of claim 13, wherein the playback device is a smart television, and wherein the remote control device is a smart television remote control.

* * * * *

UNITED STATES PATENT AND TRADEMARK OFFICE
CERTIFICATE OF CORRECTION

| | | |
|---|---|---|
| PATENT NO. | : 9,693,112 B2 | Page 1 of 1 |
| APPLICATION NO. | : 14/712622 | |
| DATED | : June 27, 2017 | |
| INVENTOR(S) | : Huadong Liu, Jun Zhang and Yi Ru | |

It is certified that error appears in the above-identified patent and that said Letters Patent is hereby corrected as shown below:

In the Specification

Column 1, Line 34 "people that at are less," should be -- people that are less --

Column 1, Line 38 "content can he" should be -- content can be --

Signed and Sealed this
Eighth Day of August, 2017

Joseph Matal
*Performing the Functions and Duties of the*
*Under Secretary of Commerce for Intellectual Property and*
*Director of the United States Patent and Trademark Office*